United States Patent
Fradkin et al.

(10) Patent No.: US 7,668,349 B2
(45) Date of Patent: Feb. 23, 2010

(54) THREE-DIMENSIONAL SEGMENTATION USING DEFORMABLE SURFACES

(75) Inventors: Maxim Fradkin, Paris (FR); Franck Laffargue, Poissy (FR); Jean-Michel Rouet, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 406 days.

(21) Appl. No.: 10/578,654

(22) PCT Filed: Nov. 3, 2004

(86) PCT No.: PCT/IB2004/003610

§ 371 (c)(1),
(2), (4) Date: May 9, 2006

(87) PCT Pub. No.: WO2005/048193

PCT Pub. Date: May 26, 2005

(65) Prior Publication Data

US 2007/0133845 A1    Jun. 14, 2007

(30) Foreign Application Priority Data

Nov. 13, 2003    (EP) .................................. 03300211

(51) Int. Cl.
*G06T 7/20*    (2006.01)
(52) U.S. Cl. ....................... 382/120; 382/154
(58) Field of Classification Search ................ 382/120, 382/154, 280; 715/764, 781, 828
See application file for complete search history.

(56) References Cited

U.S. PATENT DOCUMENTS

| | | | | |
|---|---|---|---|---|
| 5,740,267 A | * | 4/1998 | Echerer et al. | 382/132 |
| 6,614,452 B1 | * | 9/2003 | Cable | 715/764 |
| 2005/0149877 A1 | * | 7/2005 | Rice et al. | 715/764 |

* cited by examiner

*Primary Examiner*—Charles Kim
*Assistant Examiner*—Stephen R Koziol
(74) *Attorney, Agent, or Firm*—Yan Glickberg (57) ABSTRACT

An image processing system comprising 3D image data processing means of automatic mapping a 3-D Surface Model onto the surface of an object of interest in a 3-D image, for estimating a model-based 3-D segmentation surface, comprising visualizing means and further comprising means of interactive adaptation of the segmentation surface to the actual surface of the object of interest including means of interactive selection of a 2D data plane (DP) that intersects the 3-D segmentation surface along a 2-D Model Curve (MC), said Data Plane having a user-selected orientation with respect to said surface, which is appropriate for the user to visualize a 2-D portion called Aberrant Curve (AC) of said Model Curve to be modified; means of interactive definition of a Guiding Curve (GC) in the 2-D Data Plane; means of interactive adaptation of said Aberrant Curve (AC) to said Guiding Curve (GC); and means of further automatically adapting the 3D segmentation surface within a neighborhood of the interactively adapted Aberrant Curve. The surface Model is favorably a Mesh Model.

14 Claims, 7 Drawing Sheets

THREE-DIMENSIONAL SEGMENTATION USING DEFORMABLE SURFACES

FIELD OF THE INVENTION

The invention relates to an image processing system having processing means for segmenting an object of interest in a three-dimensional image using deformable surfaces. This technique comprises an operation of fitting a three-dimensional deformable Surface Model onto said three-dimensional object. The invention further relates to a medical imaging apparatus coupled to such an image processing system and to program products for processing medical three-dimensional images produced by this apparatus or system, for the segmentation of objects of interest that are body organs. The invention finds a particular application in the field of medical imaging in order to study or detect organ pathologies.

BACKGROUND OF THE INVENTION

A technique of representation of a 3-D object using a Mesh Model is already disclosed by H. DELINGETTE in the publication entitled "Simplex Meshes: a General Representation for 3-D shape Reconstruction" in "Processing of the International Conference on Computer Vision and Pattern Recognition (CVPR'94), 20-24 Jun. 1994, Seattle, USA".

In this paper, a physically based approach for recovering three-dimensional objects is presented. This approach is based on the geometry of "Simplex Meshes". Elastic behavior of the meshes is modeled by local stabilizing functions controlling the mean curvature through the simplex angle extracted at each vertex (node of the mesh). Those functions are viewpoint-invariant, intrinsic and scale-sensitive. Unlike deformable surfaces defined on regular grids, Simplex Meshes are very adaptive structures. A refinement process for increasing the mesh resolution at highly curved or inaccurate parts is also disclosed. Operations for connecting Simplex Meshes in order to recover complex models may be performed using parts having simpler shapes.

A Simplex Mesh has constant vertex connectivity. For representing 3-D surfaces, Simplex Meshes, which are called 2-Simplex Meshes, where each vertex is connected to three neighboring vertices, are used. The structure of a Simplex Mesh is dual to the structure of a triangulation as illustrated by the FIG. 1 of the cited publication. It can represent all types of orientable surface. The contour on a Simplex Mesh is defined as a closed polygonal chain consisting of neighboring vertices on the Simplex Mesh. The contour is restricted to not intersect itself, as far as possible. Contours are deformable models and are handled independently of the Simplex Mesh where they are embedded.

Four independent transformations are defined for achieving the whole range of possible mesh transformations. They consist in inserting or deleting edges in a face of the Mesh. The description of the Simplex Mesh also comprises the definition of a Simplex Angle that generalized the angle used in planar geometry; and the definition of metric parameters, which describe how the vertex is located with respect to its three neighbors.

The dynamic of each vertex is given by a Newtonian law of motion. The deformation implies a force that constrains the shape to be smooth and a force that constrains the mesh to be close to the 3-D object. Internal forces determine the response of a physically based model to external constraints. The internal forces are expressed so that they are intrinsic viewpoint invariant and scale dependant. Similar types of constraints hold for contours.

Hence, the cited publication provides a simple model for representing a given 3-D object. It defines the forces to be applied in order to reshape and adjust the model onto the 3-D object of interest. The "Simplex Mesh technique" is a robust segmentation method.

SUMMARY OF THE INVENTION

However, the "Simplex Mesh" technique that is proposed in the cited paper may not achieve a perfect segmentation in certain circumstances. For instance: in a circumstance when the three-dimensional image, which is an image of an organ, is very noisy or when the object of interest is partly blurred. In this circumstance, the automatic segmentation algorithm may yield a wrong location for the surface of the segmented object and the resulting three-dimensional surface may show one or several dissimilarities with the organ of interest. For example, the automatic segmentation algorithm may stop whereas the segmentation operation is not completed; it may progress in a wrong direction, being mislead towards a wrong but contrasted surface; or it may even regress due to the complicated surface shape, again being mislead towards a wrong surface.

The invention has for an object to propose a 3D image processing system having means for segmenting an object of interest represented in a three-dimensional image and further having interactive adaptation means for interactively modifying the segmented surface of said 3D object of interest. The interactive adaptation means comprises: user-actuated processing means for defining a 2D portion of the segmented surface to be modified in a plane; and for moving said 2D portion towards a user-defined 2D set of points in this plane; and visualization means for the user to control the operation of the user-actuated processing means.

According to the invention, said interactive adaptation means permits the user to interfering locally onto a 2D portion instead of directly acting on a 3D segmented surface of the object of interest. It is much easier for a user to act on such a 2D view instead of acting on the 3D Surface Model of segmentation that is actually displayed as a 2D image.

The interactive adaptation means also has user-actuated processing means for further defining a 3D portion around the 2D portion and for moving said 3D portion towards a region around the user-defined 2D set of points, in order to improve the fitness of the 3D Surface Model of segmentation.

It is a further object of the invention to propose such an image processing system with the interactive adapting means, which is also iterative. It is a particular object of the invention to propose such an image processing system with this interactive and iterative processing means controlled by the user, which is appropriate to perform the adaptation of the mapping of a 3-D deformable Surface Model onto the surface of the object of interest until a predetermined level of fitness with respect to the 3D object of interest is reached. The system may be applied to processing a three-dimensional gray level image. Favorably, the Surface Model of segmentation may be a 3D Mesh Model.

It is also an object of the present invention to propose an image processing method with steps for operating this system. The invention also relates to a medical diagnostic imaging apparatus coupled to this system for 3-D image processing. The medical imaging apparatus may be an X-ray medical examination apparatus or any other 3-D medical imaging apparatus, such as MRI. The invention further relates to a program product or a program package for carrying out the image processing method.

BRIEF DESCRIPTION OF THE DRAWINGS

The invention is described hereafter in detail in reference to the following diagrammatic and schematic drawings, wherein.

DETAILED DESCRIPTION OF EMBODIMENTS

The invention relates to an image processing system for segmenting an object of interest represented in a three-dimensional image, using a Deformable Surface Model Technique, or a three-dimensional Deformable Mesh Model Technique, whereby the Surface Model or the Mesh Model of segmentation is fitted onto the surface of said three-dimensional object. The object of interest may be an organ represented in a three-dimensional medical image. In the example described below, the Surface Model is a Mesh Model.

Segmenting images using discrete deformable models, like 2-Simplex meshes, often requires corrections of the resulting segmented surface. This is especially true for medical images, where due to image noise or poor data quality some salient image features may be missing. As a result, some parts of the model might be attracted to wrong features leading to partially erroneous segmented shape. Therefore, the practitioner usually would like to use his/her experience in image interpretation in order to correct the segmentation result. Moreover, the practitioner may want to guide further segmentation process by forcing the model to stick to user-imposed locations. In both cases, a preferable way to achieve this is to indicate the correct model shape by drawing a contour on a displayed image of the segmented object of interest, and then to require the system to make the model follow this contour. While the first part (drawing a model shape) of this process is quite simple to implement with the existing computer graphics know-how, e.g., by displaying the model with the medical image in background and drawing the user contour as an overlay, the second part (making the model follow the user-defined contour) is very difficult to achieve. The present invention proposes means to solve this problem.

The present invention proposes an image processing system having interactive user-actuated processing means for attracting the 3D segmented surface, or the 3D mesh surface, to a user-drawn 3D curve. This processing means is useful for user interaction with 3D deformable surfaces or 3D deformable meshes, particularly for surface or mesh shape corrections and/or imposing a desired shape on certain parts of the segmented surface or mesh surface.

Figure 5A:
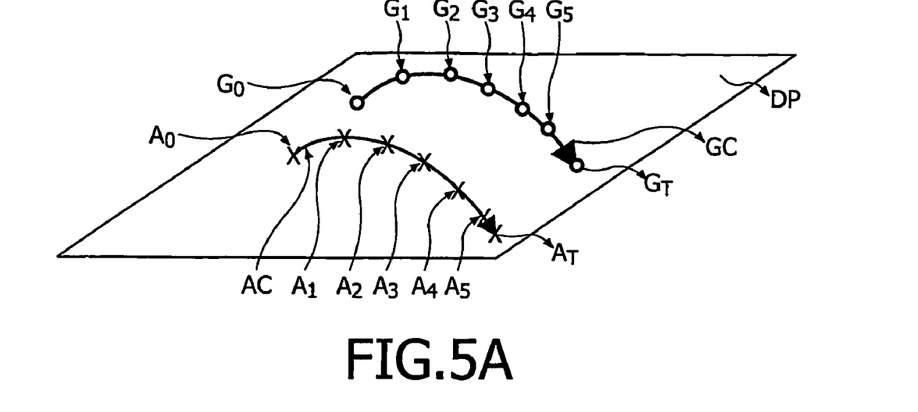
FIG. 5A illustrates the Guiding Curve with end points, the Aberrant Curve with the Mesh Edge Points and end points, and the Guiding Points on the Guiding Curve.
Figure 5B:
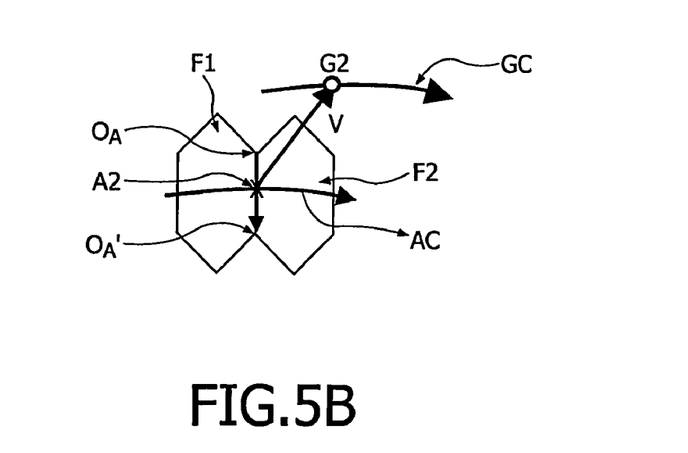
FIG. 5B illustrates two mesh faces for determination of Mesh Edge Points and Guiding points, and for defining a motion Vector.

In the following example, the segmented object of interest is a 3D object, the surface of which is represented by mesh faces defined by edges and nodes, as illustrated by FIG. 5B. The system of the invention has interactive image processing means for three-dimensional segmentation of the object of interest in a three-dimensional referential. According to the invention, said interactive image processing means permits the user of controlling the segmentation operation and of interfering where and when it is necessary in order to modify, correct or adapt at best the segmented surface to the actual surface of the object of interest. These interactive processing means, controlled by the user, permits the adaptation of the mapping of the 3-D Mesh Model onto the three-dimensional surface of the object of interest until a predetermined level of fitness chosen by the user is reached. The system may be applied to processing a three-dimensional gray level image.

Figure 1:
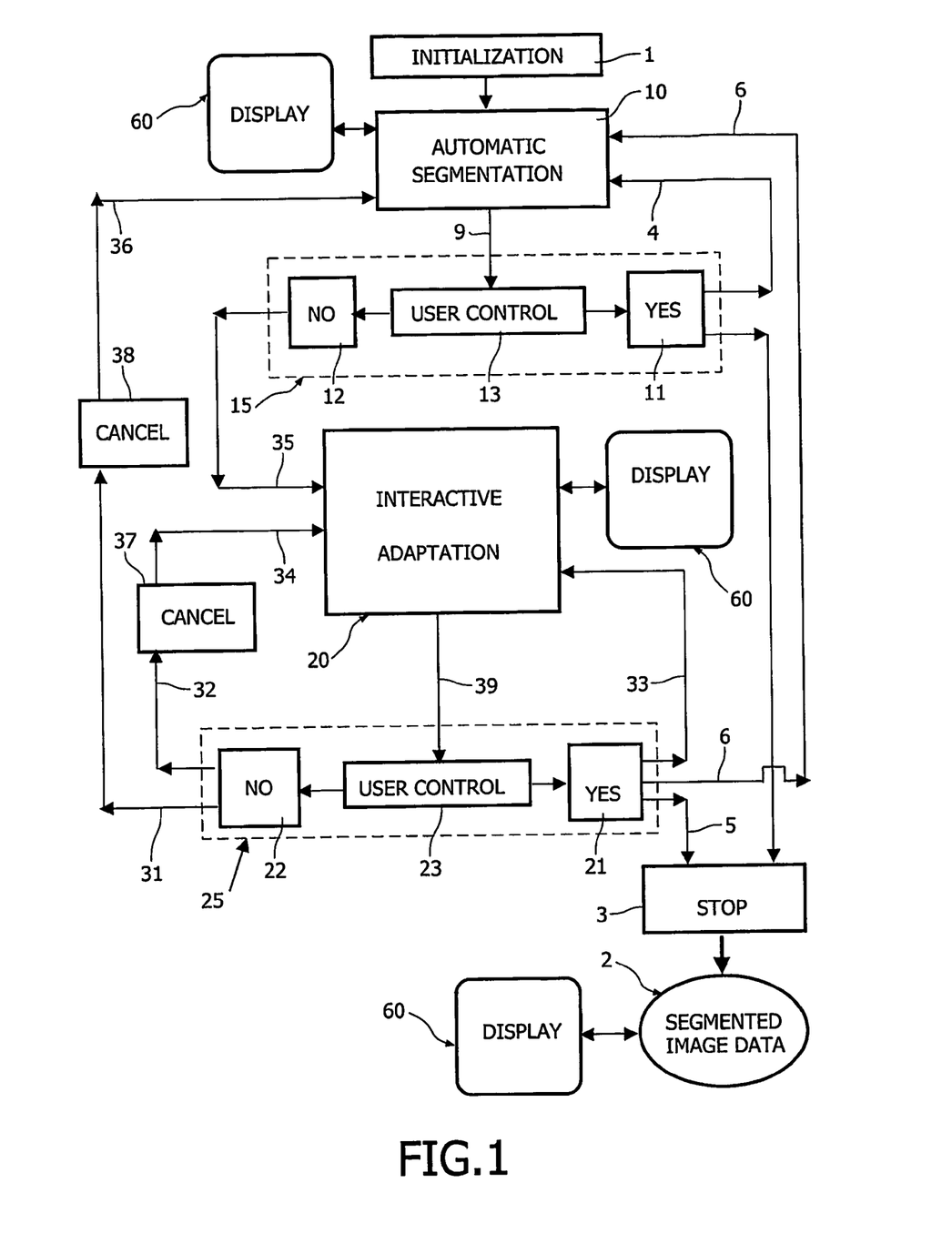
FIG. 1 shows a diagrammatic representation of the means of the system of the invention.

FIG. 1 diagrammatically represents the processing means of the system of the invention. This system has initialization means 1 for setting the parameters of the Mesh Model Technique and automatic segmentation means 10, which performs a preliminary 3D image segmentation 9 using the automatic Mesh Model Technique.

Figure 6:
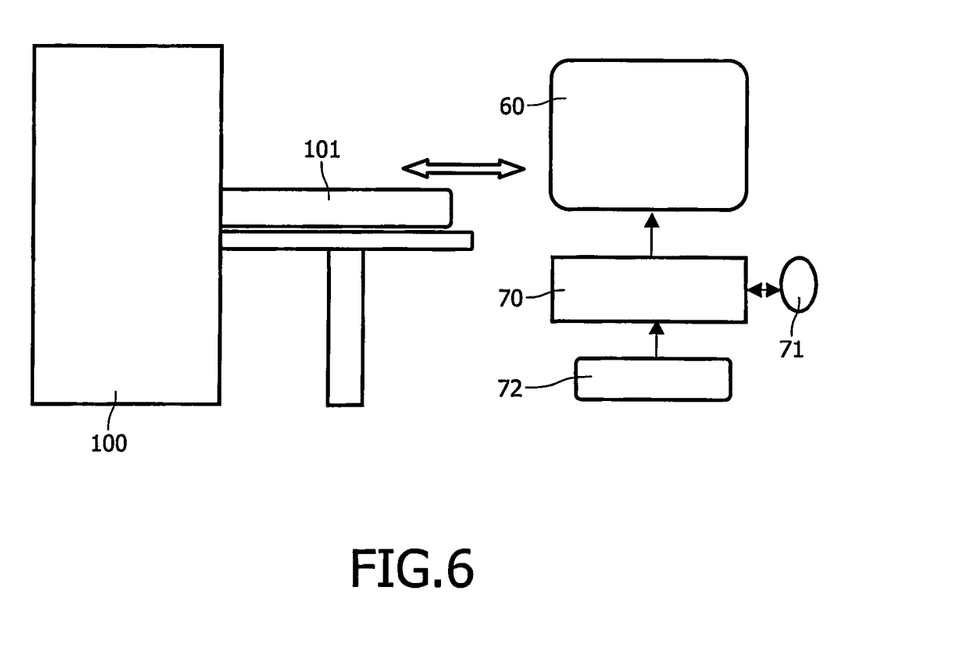
FIG. 6 illustrates a medical viewing system coupled to a medical examination apparatus.

The system has display means 60, as illustrated by FIG. 6, for the user to examine the result of the preliminary automatic segmentation, which is the image of the Mesh Model substantially fitting the surface of the object of interest. Either the user accepts the result of this preliminary segmentation or the user does not accept this result. The system has control means 15, which may be set in operation by the user in 13.

If the user accepts the result of the segmentation, then the user may actuate a control YES 11.

This control YES may lead to a STOP 3 of the segmentation operation. The STOP 3 permits of yielding directly the preliminary segmentation result as the final segmentation image data. These image data may be provided to the user as an image by display means, or as data by memory means, storing means, or other means.

Or the resulting signals data may be again entered into said automatic segmentation means 10 coupled to the YES control 11 through 4. This is when the user accepts the results yielded in 9 by the automatic segmentation means and when the user now wants to continue the segmentation using the automatic segmentation means 10.

If the user does not accept this preliminary segmentation result 9, then the user can actuate control means NO 12 in order to actuate the interactive adaptation means 20 of the invention. The user-actuated adaptation means 20 are provided for the user to enter data or information in order to interactively modify, or correct or improve the result of the preliminary automatic segmentation means 10.

After having performed interactive adaptation 20, the user further examines the segmentation result of the interactive adaptation means, for instance using the display means 60. Again, either the user accepts the result of this adapted segmentation or the user does not accept this result. The system has further control means 25, which may be set in operation by the user in 23, for the user to enter information in 37. The control means 25 may be the same as, or may be similar to the control means 15.

If the user accepts the result of the interactive adapted segmentation, then the user may actuate a control means YES 21.

If the user accepts the result of the interactive adapted segmentation, the control means 21 may lead to the STOP 3 of the segmentation operation through 5, so that this first adapted segmentation result yields the final segmentation image data provided to the user as an image by the display means 60, or as data by memory means, storing means, or other means.

Or, if the user accepts the result of the interactive adapted segmentation, and when a segmentation difficulty has just been solved interactively, now the user may want to continue the segmentation using the automatic segmentation means 10. Then, the resulting signals data may be directly ported into said automatic segmentation means 10 coupled to the YES control 21 through 23.

Or, if the user accepts the result of the interactive adapted segmentation, and when the user wants to further modify or improve the previous results of said interactive adaptation means 20, then, the user may further operate the interactive adaptation means 20, directly coupled to the YES control means 21 through coupling means 33.

If the user does not accept this first adapted segmentation result 39, then the user, through the control 23, may actuate control means NO 22.

If the user does not accept the modifications performed through the interactive adaptation means 20, then, the user may cancel these results through first cancel means 37 coupled in 32 to the NO control means 22. The resulting data signals, which are anew identical to the ones first entered in the adaptation means in 35, are further entered in 34 into said adaptation means 20 for new interactive adaptation.

Or if the user neither accepts the segmentation performed through the segmentation means 10 nor through the interactive adaptation means 20, then, the user may cancel the results yielded both by the automatic segmentation means 10 and the adaptation means 20, through second cancel means 38 coupled in 31 to the NO control means 22. The resulting data signals, which are anew identical to the ones first entered in the segmentation means 10, are further entered in 36 into said automatic segmentation means 10 in order to perform again at least the segmentation operation through 10 and the control through 15.

Figure 2:
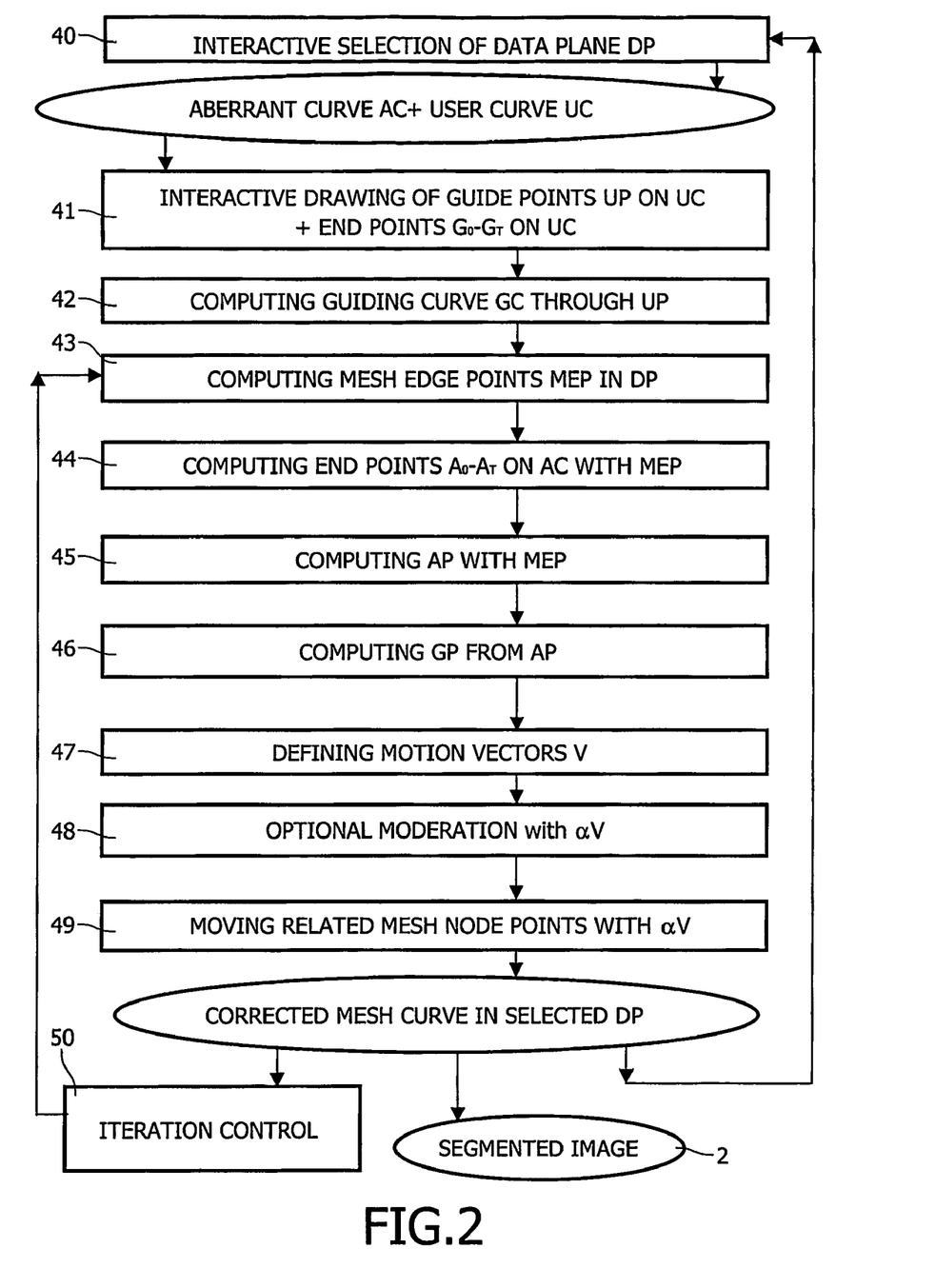
FIG. 2 shows a diagrammatic representation of the interactive adaptation means of the system of the invention.
Figure 3:
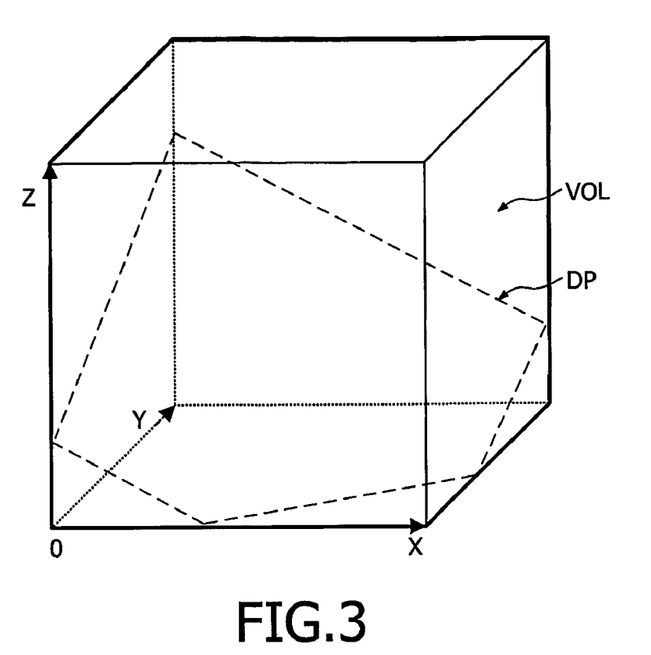
FIG. 3 illustrates a Data Plane selection.

FIG. 2 diagrammatically represents the means for carrying out the interactive adaptation 20 of the invention. The interactive adaptation means comprises:

Data Plane Selection Means 40:

Referring to FIG. 2, this interactive adaptation means 20 first comprises means 40, for the user to determine an oriented data plane DP showing a section of the segmented object of interest. In the present example, this section is a mesh curve MC representing the cut of the Mesh Model fitting the object surface according to the preliminary automatic segmentation 10 by data plane DP. The oriented data plane selection means 40 permits the user of selecting such a data plane DP, whose orientation is given within a volume of reference VOL in a three-dimensional referential OX, OY, OZ, as illustrated by FIG. 3.

Usually, a 3D image is constructed from the assembling of a certain number of two-dimensional images of points parallel to one plane of the referential, each image plane representing a section of the volume of reference VOL in the referential. It is then very difficult and fastidious for the user to identify and correct the defects of Mesh propagation in these planes, because the defects of the Mesh Model are not necessarily best seen with the given orientation of said predetermined planes.

Instead, according to the invention, the orientation of data plane DP is selected for said Data Plane to show an intersection with the segmented surface of the object of interest where a defect of segmentation is best seen. This interesting orientation can be any orientation with respect to the 3D referential. The viewing means 60 may advantageously provide both an image of the 3D Mesh Model and one 2D view or several 2D views showing calculated mesh curves MC representing the intersection curves of the 3D Mesh Model by Data Plane(s). The intersection curves may favorably be highlighted.

According to the invention, said interactive adaptation means 20 permits the user of interfering locally onto a 2D portion of the intersection curve MC in the Data Plane DP, instead of directly acting on the 3D segmented surface of the object of interest. It is much easier for a user to verify the fitness between the Surface Model and the object of interest in the given data plane by inspecting the intersection curve and to act on such a curve in a 2D view instead of directly acting on the 3D Surface Model of segmentation.

Figure 4A:
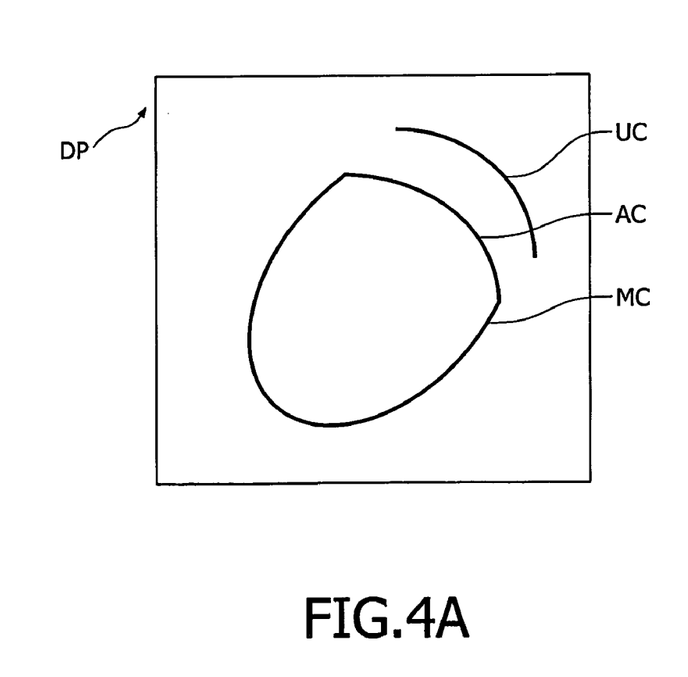
FIG. 4A schematically shows a Mesh Curve in the selected Data Plane with an Aberrant Curve and a User Curve.

Referring to FIG. 4A, the interactive adaptation means 20 permits the user to dispose of the representation of the calculated intersection of the 3D Mesh Model with the Data Plane DP, which is the 2D Mesh Curve MC. This 3D Mesh Model is the Mesh Model that is mapped at best onto the surface of the object of interest by the automatic segmentation means 10. This portion of Mesh Curve MC to be modified is called Aberrant Curve AC. The Aberrant Curve AC is the portion of mesh curve MC where the user detects that the calculated Mesh Model does not correctly fit the surface of the object to be segmented or does not correspond to the way the object of interest is chosen to be segmented.

The user actuates the plane selection means 40 for selecting the best orientation of the Data Plane DP for visualizing said 2D Mesh Curve MC to be modified or improved. The orientation of the Data Plane is varied until the user finds a view of the intersection mesh curve MC where the portion of Aberrant Curve AC of the Mesh Model is particularly visible, and where the user regards a modification or a correction of the Mesh Model as particularly necessary.

Referring to FIG. 2 and illustrated by FIG. 4A, while examining the segmented representation MC of the object of interest in the selected Data Plane DP, the user may decide that the Mesh Model should pass through another curve, called User Curve UC, instead of the Aberrant Curve AC provided by the preliminary automatic segmentation.

Figure 4B:
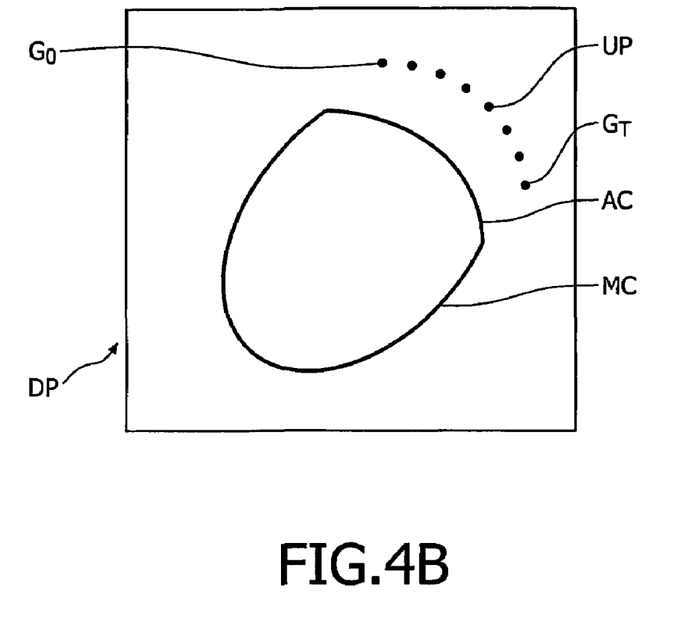
FIG. 4B shows User Points drawn along the User Curve.

Guide Points Interactive Drawing Means 41:

Referring to FIG. 2 and illustrated by FIG. 4B, the interactive adaptation means 20 comprises interactive drawing means 41 for the user to define a set of points, called User Points UP, along the wanted User Curve UC. The two points at each extremity of the User Curve are called End Points and denoted by $G_0$, $G_T$. The user draws the User Points GP including $G_0$, $G_T$ with user-actuated drawing means known of those skilled in the art, for example a click of mouse 71 shown in FIG. 6, or enters the data, for example using a keyboard 72, for displaying said User Points using display means 60.

Figure 4C:
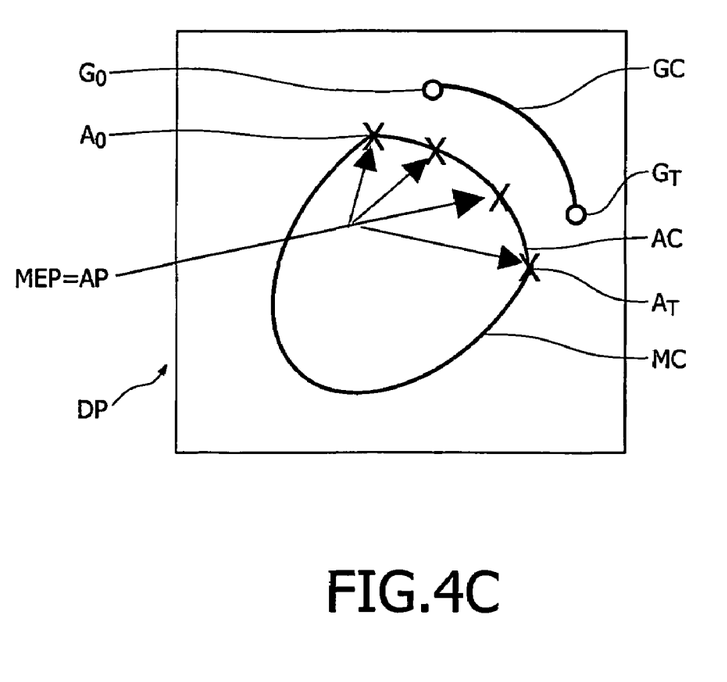
FIG. 4C shows a Guiding Curve with end points, an Aberrant Curve with Mesh Edge Points and end points.

Guiding Curve Automatic Drawing Means 42:

Referring to FIG. 2 and illustrated by FIG. 4C, the adaptation means 20 have further computing means 42 for automatically generating a Guiding Curve GC, in the Data Plane DP, passing through the User Points UP, between the end points $G_0$, $G_T$.

Computing Means 43 for Yielding Mesh Edge Points MEP

Referring to FIG. 2, FIG. 4C and FIG. B, the Interactive Adaptation Means 20 has further processing means 43 for computing the locations of points of intersection between the Mesh Model and the Data Plane DP. These points of intersection are not necessarily nodes of the Mesh Model. Thus, the means 43 computes the locations of intersections of the edges of the mesh faces, such as F1, F2, with the Data Plane DP, which determines Mesh Edge Points MEP in the Data Plane. For example, the processing means 43 first computes the edges, such as OO' of faces F1, F2, in the Data Plane, and the intersections of the edges, such as A2, with the Data Plane DP.

Computing Means 44 for Yielding the End Points of AC from Mesh Edge Points

More particularly, the Mesh Edge Points MEP that are both on the Aberrant Curve AC and nearest to the extremities $G_0$, $G_T$ of the Guiding Curve GC are automatically looked for in order to form the end points $A_0$, $A_T$ of the Aberrant Curve.

Computing Means 45 for Yielding the Points of AC from the Mesh Edge Points

Figure 4D:
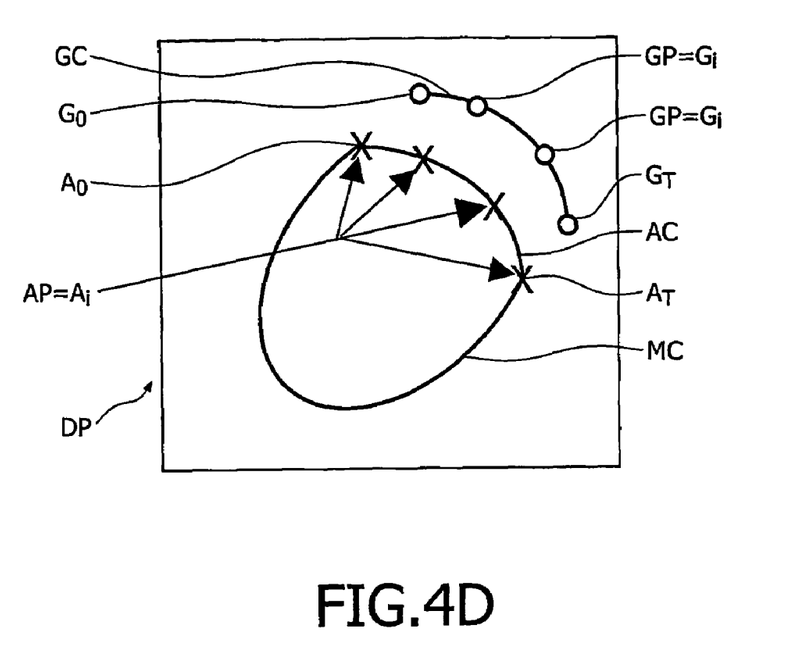
FIG. 4D shows Guiding Points on the Guiding Curve.
Figure 4E:
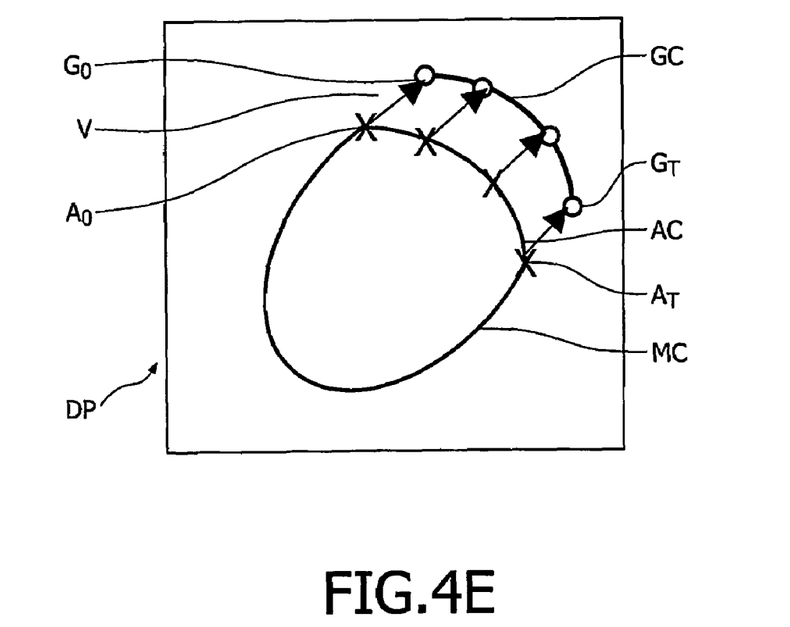
FIG. 4E shows motion vectors to map the Aberrant Curve onto the Guiding Curve.

Then, the computing means 45 selects the location of the Mesh Edge Points MEP, such as A2, of the Data Plane DP, which are located on the Aberrant Curve AC between the end points $A_0$, $A_T$. This computation yields a number of Mesh Edge Points, denoted by $A_1$, $A_2$, . . . etc, on the Aberrant Curve, as illustrated by FIG. 4C and FIG. 4D.

Processing Means 46 for Yielding Guiding Points on the Guiding Curve

The Interactive Adaptation Means 20 has further means for computing the location of points on the Guiding Curve that correspond to the Mesh Edge Points of the Aberrant Curve: As illustrated by FIG. 5A, the Mesh Edge Points $A_0$ to $A_T$ on the Aberrant Curve determine segments on this Aberrant Curve.

Parameters of a matching function are determined in order to match the Aberrant Curve AC of extremities $A_0$, $A_T$ onto the Guiding Curve GC of extremities $G_0$, $G_T$. This calculation favorably comprises the definition of the aberrant Curve into portions followed by the projection of each portion onto the Guiding Curve. For example a linear correspondence between the two Curves may be determined.

Then, the processing means 46 computes Guiding Points such as $G_1$, $G_2$, etc, on the Guiding Curve, using a linear function, thus defining, between $G_0$ and $G_T$, segments of the Guiding Curve, which are respectively proportional to the segments defined between $A_0$ and $A_T$ on the Aberrant Curve.

Figure 5C:
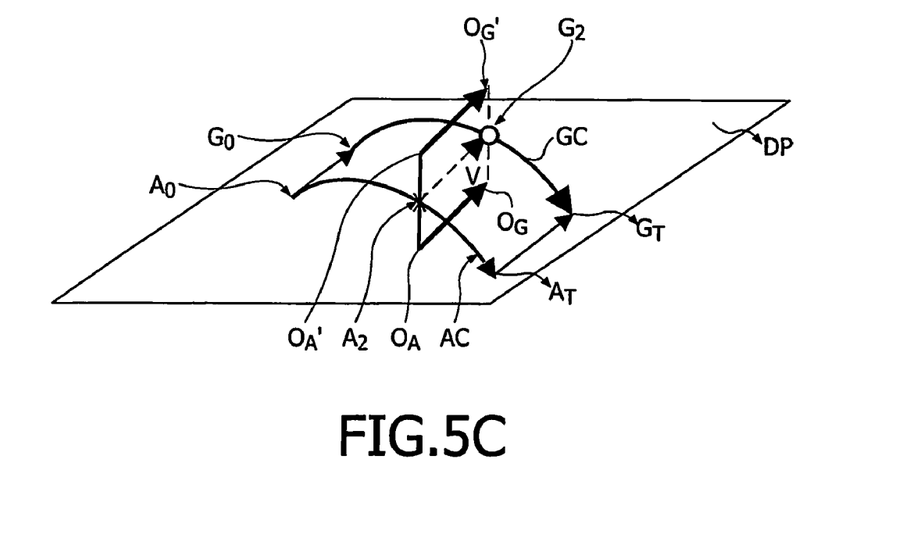
FIG. 5C illustrates the application of a motion Vector.

Processing Means 47 for Computing Motion Vectors V:

As illustrated by FIG. 4, and FIGS. 5B and 5C, the Interactive Adaptation Means 20 has further means 47 for defining vectors V, called motion vectors V, between the Aberrant Curve and the Guiding Curve. The vectors V may be computed for example as the shorter mathematical distances between the corresponding points of the two curves. FIG. 5C shows for example the vector V calculated as the shortest distance between the Mesh Edge Point $A_2$ and the corresponding Guiding Point $G_2$. The vectors V are oriented from the Aberrant Curve towards the Guiding Curve.

Processing Means 48 for Optionally Moderating Displacement Vectors:

The Interactive Adaptation Means 20 has further means 48 for providing parameters α, called damping coefficients. The displacement vectors V may be optionally moderated using the damping coefficients α.

Processing Means 49 for Moving Related Mesh Nodes Towards the Guide Curve:

The processing means 49 of the Interactive Adaptation Means 20 further moves the related mesh nodes of the faces towards the Guide Curve. Still referring to FIGS. 5B and 5C, the vectors V are applied to each extremities, called nodes, such as $O_A$, $O_A'$, of the edge between the faces, such as F1 and F2, in the portion $A_0$, $A_T$ of the Aberrant Curve AC. The resulting nodes are denoted by $O_G$, $O_G'$ on FIG. 5C.

The Result 50 of the Motion of Node Points:

Using vectors V or αV, a linear mapping of the Aberrant Curve has been performed onto the Guiding Curve. At this stage the adaptation of the Mesh Curve has been performed once. The user has display means and control means for estimating the result of the Interactive Adaptation means 20. Either the Interactive Adaptation means yields directly a corrected mesh curve 52, or the user may use the control iteration means 50:

User-Controlled Iteration Means 50:

The user may initiate a new calculation 43 for yielding modified vectors V or αV, in order to improve the adaptation of the Mesh Curve. The processing means 43 to 49 are user-activated until the user is satisfied with the result or until a predetermined level of fitness is reached.

Figure 5D:
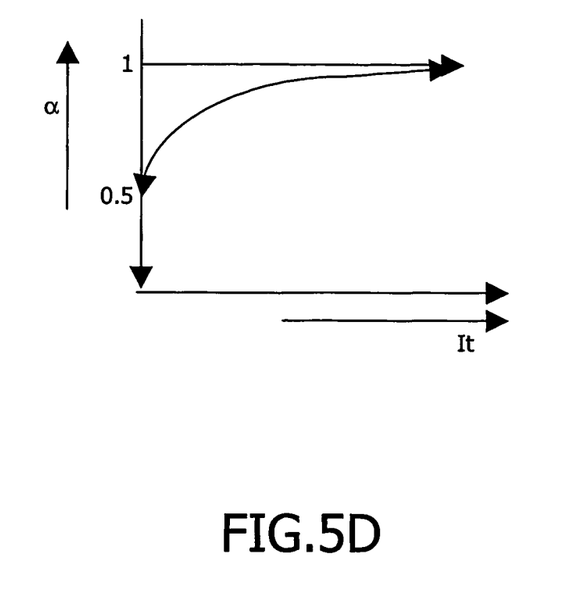
FIG. 5D shows an example of curve α in function of the number of iterations.

In the iteration process, favorably a weighting coefficient α is applied to the motion vector V. This weighting coefficient is adapted to the user-controlled technique of mapping the Aberrant Curve onto the Guide Curve. The weighting coefficient α is for instance determined from a function, such as represented on FIG. 5D, which shows a curve α in function of the number of iterations $N_{It}$. So, the damp coefficients α are such that $0 < α ≦ 1$. The vectors αV are smaller than the corresponding vectors V, and the value of α is increased at each iteration step. Referring to FIG. 5D, it is to be noted that the process may favorably begin by using small α values such as ½, then the α values may be increased towards 1, when the number of iterations increases.

Favorably, the α values may be applied to the vectors used for moving the nodes of the edges intersecting the Data Plane. A neighborhood may be defined around said nodes, and, in said neighborhood, the nodes of the Mesh Model may be applied local regularization forces such as the forces defined in the publication cited as prior art (Delingette).

The distance between the moved Aberrant Curve and the Guiding Curve may be estimated after each iteration step, and the iteration process may be stopped when the distance is smaller than a predetermined threshold of distance.

It is to be noted that the Mesh Model is first defined with a predetermined resolution, meaning a predetermined size of the faces of the Mesh. In order to improve the fitting of the segmentation surface onto the actual surface of the object of interest, the resolution may be favorably either increased or decreased.

Referring to FIG. 1 and FIG. 2, these operations may be carried out in several different 2D data planes of the volume, that contain aberrant curves resulting from preliminary segmented zones. According to the invention, these operations are further carried out using the adaptive segmentation means 20 controlled by the user until the Mesh Model fulfills fitting conditions predetermined by the user. This system permits to refining the segmented object in the 3D image, up to a level of fitness of mapping of the Mesh Model onto the object, which the user regards as a satisfying result. The interactive segmentation may be performed in any plane of the volume for providing such an improved segmented 3D object. As described above, the processing means of the invention may be applied to as many data Plane and Aberrant Curve as necessary for obtaining a segmentation of the object of interest that is conform to the needs of the user.

Stop Means 30:

When the user finally decides to accept the result yielded by the segmentation means, the user actuates the YES means and the Stop means 30, as illustrated by FIG. 1. Then, the user may dispose of a segmented image 2, or of segmented image data.

Medical Examination Apparatus and Viewing System

The above-described means are included in or coupled to the viewing system of the invention. FIG. 6 shows the basic components of an embodiment of an image viewing system in accordance to the present invention, incorporated in a medical examination apparatus. The medical examination apparatus 100 may include a bed 110 on which the patient lies or another element for localizing the patient relative to the imaging apparatus. The medical imaging apparatus 100 may be a CT scanner or other medical imaging apparatus such as x-rays or ultrasound apparatus. The image data produced by the apparatus 100 is fed to data processing means 70, such as a general-purpose computer, that comprises computation means and user control means appropriate to form the interactive adaptation means of the invention. The data processing means 70 is typically associated with a visualization device, such as a monitor 60, and an input device 72, such as a keyboard, or a mouse 71, pointing device, etc. operative by the user so that he can interact with the system. The data processing device 70 is programmed to implement the processing means for processing medical image data according to invention. In particular, the data processing device 70 has computing means and memory means necessary to perform the operations described in relation to FIG. 1 and FIG. 4. A computer program product having pre-programmed instructions to carry out these operations can also be implemented.

The drawings and their description herein before illustrate rather than limit the invention. It will be evident that there are numerous alternatives that fall within the scope of the appended claims. Moreover, although the present invention has been described in terms of generating image data for display, the present invention is intended to cover substantially any form of visualization of the image data including, but not limited to, display on a display device, and printing. Any reference sign in a claim should not be construed as limiting the claim.

The invention claimed is:

1. A computer program product having program code encoded in a computer readable medium for execution by an image processing system comprising a visualization device, said code comprising 3D image data processing code for automatically mapping a 3D Surface Model onto the surface of an object of interest in a 3D image, for estimating a model-based 3D segmentation surface, and further comprising:

interactive adaptation code for interactively adapting the segmentation surface to the actual surface of the object of interest including:

interactive selection code for interactively selecting a 2D Data Plane (DP) that intersects the 3D segmentation surface along a 2D Model Curve (MC), said 2D Data Plane having a user-selected orientation with respect to said surface, which enables the user to visualize a 2D portion called Aberrant Curve (AC) of said Model Curve to be modified;

interactive definition code for interactively defining a Guiding Curve (GC) in the 2D Data Plane;

code for interactively adapting said Aberrant Curve (AC) to said Guiding Curve (GC); and code for further automatically adapting the 3D segmentation surface within a neighborhood of the interactively adapted Aberrant Curve.

2. The computer program product of claim 1, having user-controlled drawing code to define a User Curve (UC), User Points including end points on the User Curve for the processing system to draw the Guiding Curve (GC) through the User Points between the end points and for the interactive adaptation code to adapt the Aberrant Curve (AC) to said Guiding Curve (GC).

3. The computer program product of claim 2, wherein the interactive adaptation code has processing code to calculate intersection points (MEP) of the segmentation surface with the Data Plane (DP), and user-actuated selection code to select particular intersection points as end points of the Aberrant Curve (AC) and intersections points, called Aberrant Points (AP) located on the Aberrant Curve between said end points.

4. The computer program product of claim 3, wherein the interactive adaptation code has processing code to calculate Guiding Points located on the Guiding Curve corresponding to the Aberrant points on the Aberrant Curve.

5. The computer program product of claim 4, wherein the interactive adaptation code has processing code to define motion vectors between Aberrant points on the Aberrant Curve and corresponding Guiding Points on the Guiding Curve for locally mapping the Aberrant Curve onto the Guiding Curve using said motion vectors.

6. The computer program product of claim 5, wherein the interactive adaptation code has processing code for iterative adaptation of the region around the Aberrant Curve onto a region around the Guiding Curve, with evolution of weighting factor in function of iteration steps.

7. The computer program product of claim 1, wherein the Surface model is a Mesh model.

8. The computer program product of claim 7, comprising:

acquisition code for acquiring a three-dimensional image of an object of interest to be segmented, automatic segmentation code for generating a Mesh Model, formed of polygonal faces with common edges and nodes and automatically deforming the Mesh Model in order to map said Mesh Model onto said object of interest for yielding the segmentation surface;

wherein the Interactive adaptation code has code for interactively adapting said Mesh Model in order to locally modify regions of the Mesh Model, wherein the intersection points of the Model Surface on the Aberrant Curve are intersection points of face edges, called Mesh edge Points, with the Data Plane; the motion vectors are defined between said Mesh Edge Points and corresponding Guiding Points of the Guiding Curve; and the motion vectors are used to modify the face nodes around said Mesh Edge Points to provide adapted points around the Guiding Curve.

9. The computer program product of claim 7, wherein the interactive adaptation code has iterative processing code for iterative adaptation of the region around the Aberrant Curve onto a region around the Guiding Curve, with evolution of internal forces in function of iteration steps.

10. The computer program product of claim 7, wherein the interactive adaptation code has iterative processing code for iterative adaptation of the region around the Aberrant Curve onto a region around the Guiding Curve, with evolution of resolution in function of iteration steps.

11. The computer program product of claim 1, further comprising code for:
   taking a decision to stop the process of interactive adaptation or automatic segmentation of the Surface Model onto the object of reference in function of a predetermined fitness level.

12. The computer program product of claim 1, having display code to display 3D views of the segmentation surface, at least one of 3D and 2D views of the Data Plane, at least one of 3D and 2D views of the data plane intersection, called Model Curve (MC), with the segmentation surface, with or without highlighting said Model Curve (MC), said views being displayed one at a time or several at a time.

13. The computer program product of claim 1, wherein the image processing system is a medical imaging system comprising a suitably programmed computer or a special purpose processor, which is arranged to process medical image data.

14. The computer program product of claim 1, wherein the image processing system is a medical examination imaging apparatus, further comprising:
   code to acquire a three-dimensional image of an organ of a body.

* * * * *